(12) United States Patent
Kato

(10) Patent No.: US 10,019,315 B2
(45) Date of Patent: Jul. 10, 2018

(54) CONTROL DEVICE FOR A STORAGE APPARATUS, SYSTEM, AND METHOD OF CONTROLLING A STORAGE APPARATUS

(71) Applicant: FUJITSU LIMITED, Kawasaki-shi, Kanagawa (JP)

(72) Inventor: Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/456,655

(22) Filed: Mar. 13, 2017

(65) Prior Publication Data

US 2017/0300383 A1 Oct. 19, 2017

(30) Foreign Application Priority Data

Apr. 13, 2016 (JP) .................................. 2016-080192

(51) Int. Cl.
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 9,389,958 | B2* | 7/2016 | Sundaram | ............... G11C 29/52 |
| 2005/0228943 | A1* | 10/2005 | DeCenzo | ............ G06F 11/1076 |
| | | | | 711/114 |
| 2006/0143418 | A1* | 6/2006 | Takahashi | ............. G06F 3/0605 |
| | | | | 711/165 |

(Continued)

FOREIGN PATENT DOCUMENTS

| | | |
|---|---|---|
| JP | 2010-152551 A | 7/2010 |
| JP | 2012-068862 A | 4/2012 |

(Continued)

OTHER PUBLICATIONS

"Coping with Redundancy, Active Replacement and Active Additional Installation of Components" [online] <http://www.fujitsu.com/jp/products/computing/storage/disk/eternus-dx/feature/019/> Internet Search, Mar. 11, 2016 (Total 5 pages including a partial translation of the lines 1 to 10 above the figure).

*Primary Examiner* — Mujtaba M Chaudry
(74) *Attorney, Agent, or Firm* — Fujitsu Patent Center

(57) ABSTRACT

A control device for a storage apparatus including a first storage device, a second storage device, and a third storage device, the control device includes a memory, and a processor coupled to the memory and configured to store, in the third storage device, first parity data generated based on first data stored in the first storage device and second data stored in the second storage device, store, in the first storage device, third data as update data of the first data, execute reading the first data and the third data from the first storage device and reading the first parity data from the third storage (Continued)

device when garbage collection for the first storage device is performed, and execute generating second parity data based on the read first data, the read third data, and the read first parity data.

20 Claims, 16 Drawing Sheets

(56) References Cited

U.S. PATENT DOCUMENTS

| | | | | |
|---|---|---|---|---|
| 2007/0208921 | A1* | 9/2007 | Hosouchi | G06F 1/3203 |
| | | | | 711/170 |
| 2008/0126855 | A1* | 5/2008 | Higashijima | G06F 11/0727 |
| | | | | 714/16 |
| 2010/0161883 | A1 | 6/2010 | Kurashige | |
| 2010/0293440 | A1* | 11/2010 | Thatcher | G06F 11/073 |
| | | | | 714/764 |
| 2011/0113234 | A1* | 5/2011 | Augenstein | G06F 3/0605 |
| | | | | 713/150 |
| 2012/0072680 | A1 | 3/2012 | Kimura et al. | |
| 2012/0151124 | A1* | 6/2012 | Baek | G06F 12/0246 |
| | | | | 711/103 |
| 2012/0317340 | A1 | 12/2012 | So et al. | |
| 2013/0304976 | A1 | 11/2013 | Danilak | |
| 2015/0205667 | A1* | 7/2015 | Bonwick | G06F 11/1076 |
| | | | | 714/6.24 |
| 2015/0205670 | A1* | 7/2015 | Bonwick | G06F 11/1076 |
| | | | | 714/766 |

FOREIGN PATENT DOCUMENTS

| | | |
|---|---|---|
| JP | 2013-016147 A | 1/2013 |
| JP | 2013-257900 A | 12/2013 |

* cited by examiner

FIG. 8

STATE 1 — 801

| SSD | LBA | BLOCK NUMBER FOR I/O | PAGE NUMBER FOR I/O | BLOCK NUMBER FOR RECOVERY | PAGE NUMBER FOR RECOVERY |
|---|---|---|---|---|---|
| 1 | 100 | 0 | 0 | 0 | 0 |
| 2 | 100 | 1 | 1 | 1 | 1 |
| 3 | 100 | 2 | 2 | 2 | 2 |
| 4 | 100 | - | - | 3 | 3 |

⇩ IN-PLACE UPDATE OF A TO A'

STATE 2 — 802

| SSD | LBA | BLOCK NUMBER FOR I/O | PAGE NUMBER FOR I/O | BLOCK NUMBER FOR RECOVERY | PAGE NUMBER FOR RECOVERY |
|---|---|---|---|---|---|
| 1 | 100 | 10 | 10 | 0 | 0 |
| 2 | 100 | 1 | 1 | 1 | 1 |
| 2 | 200 | 20 | 20 | - | - |
| 3 | 100 | 2 | 2 | 2 | 2 |
| 4 | 100 | - | - | 3 | 3 |

⇩ Erasure Coding

STATE 3 — 803

| SSD | LBA | BLOCK NUMBER FOR I/O | PAGE NUMBER FOR I/O | BLOCK NUMBER FOR RECOVERY | PAGE NUMBER FOR RECOVERY |
|---|---|---|---|---|---|
| 1 | 100 | 10 | 10 | 10 | 10 |
| 2 | 100 | 1 | 1 | 1 | 1 |
| 3 | 100 | 2 | 2 | 2 | 2 |
| 4 | 100 | - | - | 30 | 30 |

FIG. 10

STATE 1 — 801

| | SSD | LBA | BLOCK NUMBER FOR I/O | PAGE NUMBER FOR I/O | BLOCK NUMBER FOR RECOVERY | PAGE NUMBER FOR RECOVERY |
|---|---|---|---|---|---|---|
| 801-1 | 1 | 100 | 0 | 0 | 0 | 0 |
| 801-2 | 2 | 100 | 1 | 1 | 1 | 1 |
| 801-3 | 3 | 100 | 2 | 2 | 2 | 2 |
| 801-4 | 4 | 100 | - | - | 3 | 3 |

⇩ in-place UPDATE OF A TO A'

STATE 2 — 802

| | SSD | LBA | BLOCK NUMBER FOR I/O | PAGE NUMBER FOR I/O | BLOCK NUMBER FOR RECOVERY | PAGE NUMBER FOR RECOVERY |
|---|---|---|---|---|---|---|
| 802-1 | 1 | 100 | 10 | 10 | 0 | 0 |
| 802-2 | 2 | 100 | 1 | 1 | 1 | 1 |
| 802-3 | 2 | 200 | 20 | 20 | - | - |
| 802-4 | 3 | 100 | 2 | 2 | 2 | 2 |
| 802-5 | 4 | 100 | - | - | 3 | 3 |

⇩ SSD 423-3 FAILS

STATE 4 — 1001

| | SSD | LBA | BLOCK NUMBER FOR I/O | PAGE NUMBER FOR I/O | BLOCK NUMBER FOR RECOVERY | PAGE NUMBER FOR RECOVERY |
|---|---|---|---|---|---|---|
| 1001-1 | 1 | 100 | 10 | 10 | 0 | 0 |
| 1001-2 | 2 | 100 | 1 | 1 | 1 | 1 |
| 1001-3 | 2 | 200 | 20 | 20 | - | - |
| 1001-4 | ~~3~~ | ~~100~~ | ~~2~~ | ~~2~~ | ~~2~~ | ~~2~~ |
| 1001-5 | 4 | 100 | - | - | 3 | 3 |

CONTROL DEVICE FOR A STORAGE APPARATUS, SYSTEM, AND METHOD OF CONTROLLING A STORAGE APPARATUS

CROSS-REFERENCE TO RELATED APPLICATION

This application is based upon and claims the benefit of priority of the prior Japanese Patent Application No. 2016-080192, filed on Apr. 13, 2016, the entire contents of which are incorporated herein by reference.

FIELD

The embodiment relates to a control device for a storage apparatus, a system and a method of controlling a storage apparatus.

BACKGROUND

There is a redundant array of inexpensive disks (RAID) technology that combines a plurality of storage devices and operates the plurality of storage devices as a virtual disk. Here, at a particular RAID level, parity data is generated from a plurality of pieces of data in advance, and when one piece of data among the plurality of pieces of data is lost, the lost data is restored from the other pieces of data excluding the lost data among the plurality of pieces of data and the parity data. In addition, there are storage devices having a flash memory as a storage medium.

There is a related technology that obtains conditions such as a writing address, a size and the like that accompany a writing command, and determines from the obtained conditions whether to write data as a parity group or to write the data as a duplicated group. In addition, there is a technology that writes data and redundant information used to correct a data error to different semiconductor memory drives, individually, and stores a table associating the respective physical addresses and logical addresses of a given number of pieces of first data with the physical address of the redundant information. In addition, there is a technology that receives a storage command to provide data redundancy in accordance with the redundancy system of RAID 1, and converts the command to provide data redundancy in accordance with the data redundancy system of RAID 5. In addition, there is a technology that generates parity and writes the parity as nth data each time n−1 pieces of data are written, stores a logical address in a redundant area of a page at a time of data writing, generates parity for the logical address, and writes the parity to a redundant area of a page for writing the nth data. As related technology documents, there are Japanese Laid-open Patent Publication No. 2013-016147, Japanese Laid-open Patent Publication No. 2012-068862, Japanese Laid-open Patent Publication No. 2013-257900, and Japanese Laid-open Patent Publication No. 2010-152551.

SUMMARY

According to an aspect of the embodiment, a control device for a storage apparatus including a first storage device, a second storage device, and a third storage device, the control device includes a memory, and a processor coupled to the memory and configured to store, in the third storage device, first parity data generated based on first data stored in the first storage device and second data stored in the second storage device, store, in the first storage device, third data as update data of the first data, execute reading the first data and the third data from the first storage device and reading the first parity data from the third storage device when garbage collection for the first storage device is performed, and execute generating second parity data based on the read first data, the read third data, and the read first parity data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram of assistance in explaining an example of update of FTL address conversion tables 611 at a time of data update;

FIG. 10 is a diagram of assistance in explaining an example of update of the FTL address conversion tables 611 at a time of recovery;

DESCRIPTION OF EMBODIMENT

According to the related technology, for a RAID group formed by a plurality of storage devices each having a flash memory as a storage medium, parity data is generated each time data is updated, so that writing performance is degraded. For example, in order to generate the parity data, the data before the update, data after the update, and parity data are read, and calculation of the parity data is performed.

Thus, writing performance is degraded by an amount corresponding to the reading and an amount corresponding to the calculation of the parity data. In addition, a maximum number of times that a NAND-type flash memory may be written is determined. Frequent writing of a NAND-type flash memory is therefore a cause of a failure.

An embodiment of an information processing device, a RAID control method, and a RAID control program according to the disclosure will hereinafter be described in detail with reference to the drawings.

Figure 1:
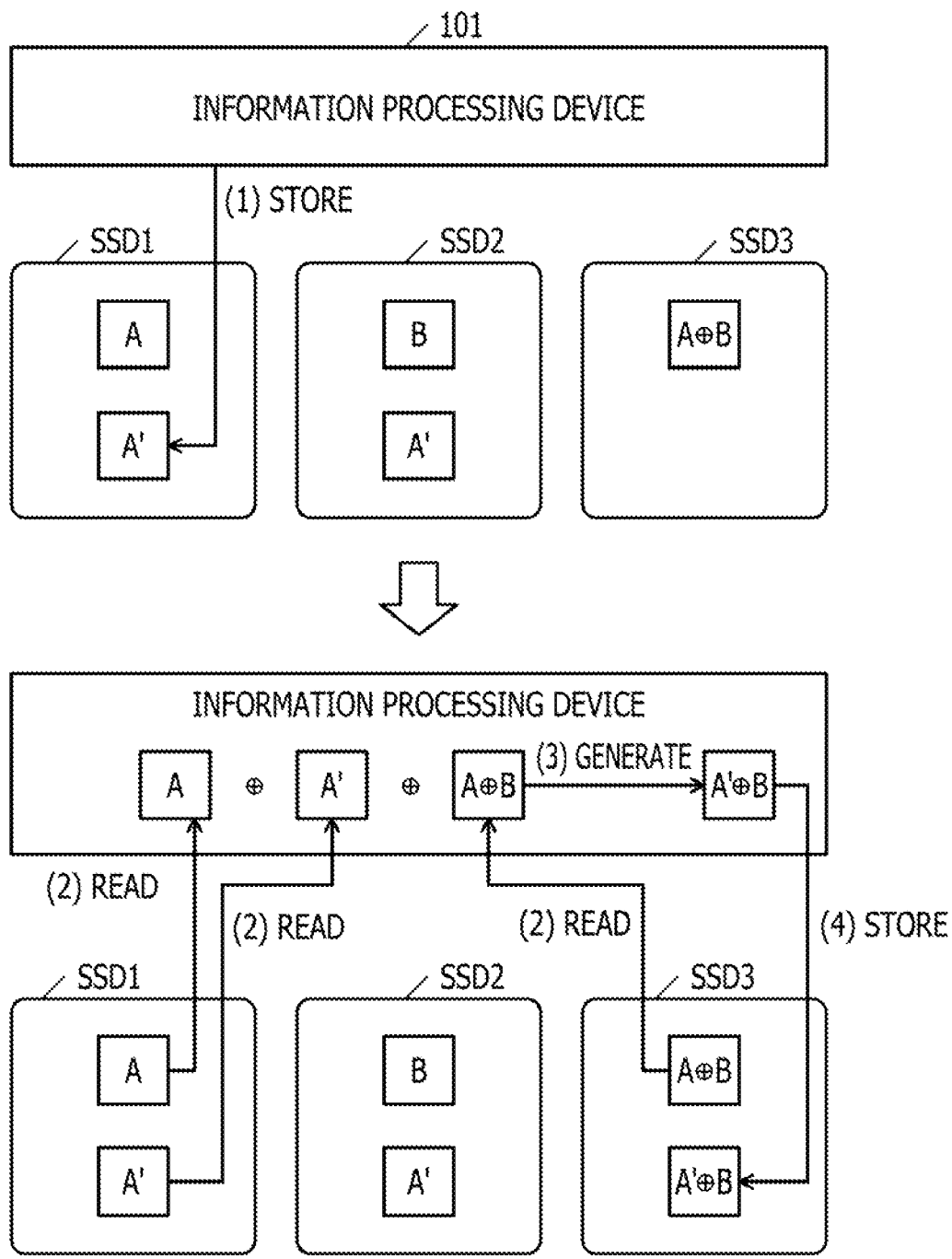
FIG. 1 is a diagram of assistance in explaining an example of operation of an information processing device 101 according to a present embodiment.

FIG. 1 is a diagram of assistance in explaining an example of operation of an information processing device 101 according to the present embodiment. The information processing device 101 is a computer that controls a plurality of storage devices each having a flash memory as a storage medium. The information processing device 101 is, for example, a disk array device or a server. A storage device having a flash memory as a storage medium is referred to as a SSD. For example, the information processing device 101 forms a RAID group based on a RAID technology by using a plurality of SSDs, and provides a virtual disk formed by the RAID group to a user of the information processing device 101. A RAID group is a group of storage devices forming one virtual disk.

In addition, the RAID technology has RAID levels representing manners of formation of virtual disks. Virtual disks formed according to RAID levels of RAID 1 or higher have redundancy, so that even when some storage devices fail, data may be restored from other storage devices.

For example, RAID 1 is a redundancy method referred to as Replication, and is a technology that ensures redundancy by writing data written to one storage device also to another storage device. In addition, RAID 5 and 6 are a redundancy method referred to as Erasure Coding, and is a technology that ensures redundancy by generating parity data from a plurality of pieces of data. For example, in RAID 5 and 6, when one piece of data among a plurality of pieces of data is lost, the one piece of data is restored from other pieces of data excluding the one piece of data of the plurality of pieces of data and parity data. The restoration of the data will hereinafter be referred to as "recovery."

Here, RAID 1 and RAID 5 and 6 each have advantages and disadvantages. As a method for making the most of the advantages of both, there is a method of automatically switching a RAID level. The method of automatically switching a RAID level will hereinafter be referred to as "Multi-Level RAID." The respective advantages and disadvantages of RAID 1 and RAID 5 and 6 and details of Multi-Level RAID will be described with reference to FIG. 2. In addition, suppose in the following description that Multi-Level RAID switches between RAID 1 and RAID 5.

However, writing performance is degraded when Erasure Coding is performed in Multi-Level RAID. For example, parity data is recalculated by Erasure Coding. In order to generate the parity data, data before an update, data after the update, and parity data are read, and the parity data is calculated. Hence, writing performance is degraded by an amount corresponding to the reading and an amount corresponding to the calculation of the parity data. Details of reasons for the degradation in writing performance in Erasure Coding will be illustrated with reference to FIG. 3.

Moreover, a maximum number of times that a flash memory, particularly a NAND-type flash memory may be written is determined. Frequent writing of a NAND-type flash memory is therefore a cause of a failure.

The following two methods are conceivable for updating Erasure Coded data. The first method is a method of updating the data by overwriting (in-place update). The number of times of writing in this method is three. However, in this method, an update of parity data occurs, and thus writing performance is degraded. The second method is a method of Replication in other SSDs. In this method, however, the number of times of writing is increased from three to four. Disadvantages of the in-place update as the first method and the method of Replication in other SSDs as the second method will be described with reference to FIG. 16.

Here, NAND-type flash memories have characteristics of retaining old data until garbage collection (GC) processing occurs. The GC processing in a NAND-type flash memory is processing of copying only data used within a certain block to another block, and deleting all of data in the certain block.

Accordingly, in the present embodiment, description will be made of writing, at a time of an update of data in a certain SSD, data after the update to a different region without overwriting the data before the update in the foregoing SSD and without generating parity data, and generating parity data from the data after the update at a time of a start of GC processing.

An example of operation of the information processing device 101 will be described with reference to FIG. 1. The information processing device 101 illustrated in FIG. 1 controls SSDs 1 to 3 as a plurality of SSDs forming a RAID group. Then, the SSD 1 stores data A, the SSD 2 stores data B, and the SSD 3 stores AxorB representing an exclusive OR of A and B as parity data of the data A and B. Here, in figures, xor is denoted by a symbol of + enclosed in a circle.

When updating the data A in the SSD 1 as one storage device, as indicated by (1) in an upper part of FIG. 1, the information processing device 101 writes data A' after the update of the data A in another storage area different from a storage area in which the data A is stored in the SSD 1. Here, the information processing device 101 may write the data A' as a replica in an SSD different from the SSD 1. In the example of FIG. 1, the information processing device 101 writes the data A' as a replica in the SSD 2.

Then, at a time of a start of GC processing of the SSD 1, in order to generate parity data of the data A', as indicated by (2) in a lower part of FIG. 1, the information processing device 101 reads the data A and A' from the SSD 1, and reads AxorB from the SSD 3. Further, as indicated by (3) in the lower part of FIG. 1, the information processing device 101 generates parity data A'xorB as parity data of the data A' based on the data A'. In the example of FIG. 1, the information processing device 101 obtains A'xorB by calculating AxorA'xor(AxorB).

Here, the method of generating the parity data A'xorB is not limited to the method illustrated in FIG. 1. For example, the information processing device 101 may read the data A' from the SSD 1, read the data B from the SSD 2, and generate the parity data A'xorB by calculating A'xorB.

After generating the parity data A'xorB, as indicated by (4) in the lower part of FIG. 1, the information processing device 101 stores the parity data A'xorB in the SSD 3. The information processing device 101 may thereby improve writing performance, because the number of times of parity data writing that occurs each time writing is performed is reduced. An example of operation of Multi-Level RAID will next be described with reference to FIG. 2.

Figure 2:
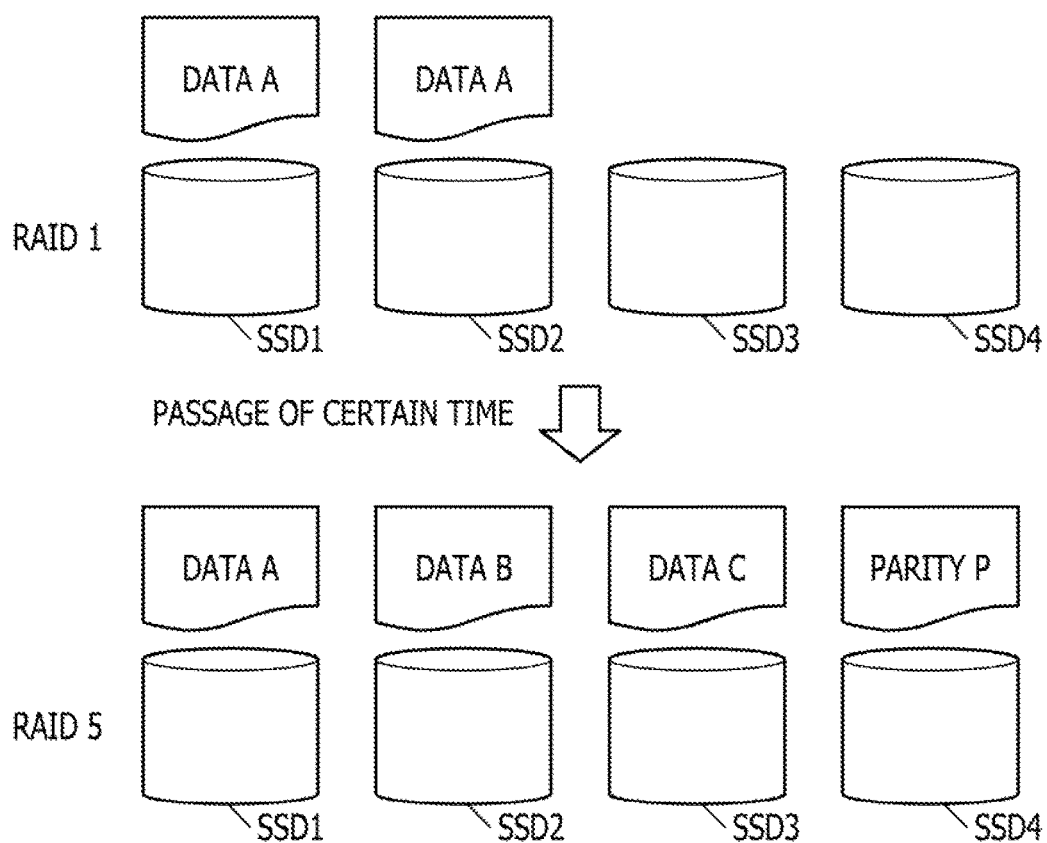
FIG. 2 is a diagram of assistance in explaining an example of operation of Multi-Level RAID.

FIG. 2 is a diagram of assistance in explaining an example of operation of Multi-Level RAID. As described with reference to FIG. 1, Multi-Level RAID is a method of automatically switching a RAID level. Here, RAID 1 merely writes to two storage devices, and therefore has an advantage of high writing performance. On the other hand, RAID 1 consumes a space twice an amount of user data, and therefore has a disadvantage of degraded capacity efficiency. RAID 5 and 6 consume only a space corresponding to an amount of user data multiplied by (Number of Storage Devices Included in Raid Group)/(Number of Storage Devices Included in Raid Group−Number of Storage Devices Storing Parity Data). RAID 5 and 6 therefore have an advantage of better capacity efficiency than RAID 1. On the other hand, RAID 5 and 6 update parity data, and therefore have a disadvantage of degraded writing performance as compared with RAID 1.

Hence, Multi-Level RAID is a technology that obtains high writing performance by RAID 1 at a time of writing, and which improves capacity efficiency by converting old data to RAID 5 and 6 when a certain time has passed.

In the example of FIG. 2, Multi-Level RAID writes data A to an SSD 1 and an SSD 2 by RAID 1 at a time of writing of the data A. Then, when a certain time has passed, by RAID 5, Multi-Level RAID writes data A to C to SSDs 1 to 3, respectively, and writes parity P generated by AxorBxorC to an SSD 4.

Reasons for low writing performance of Erasure Coding will next be described with reference to FIG. 3.

Figure 3:
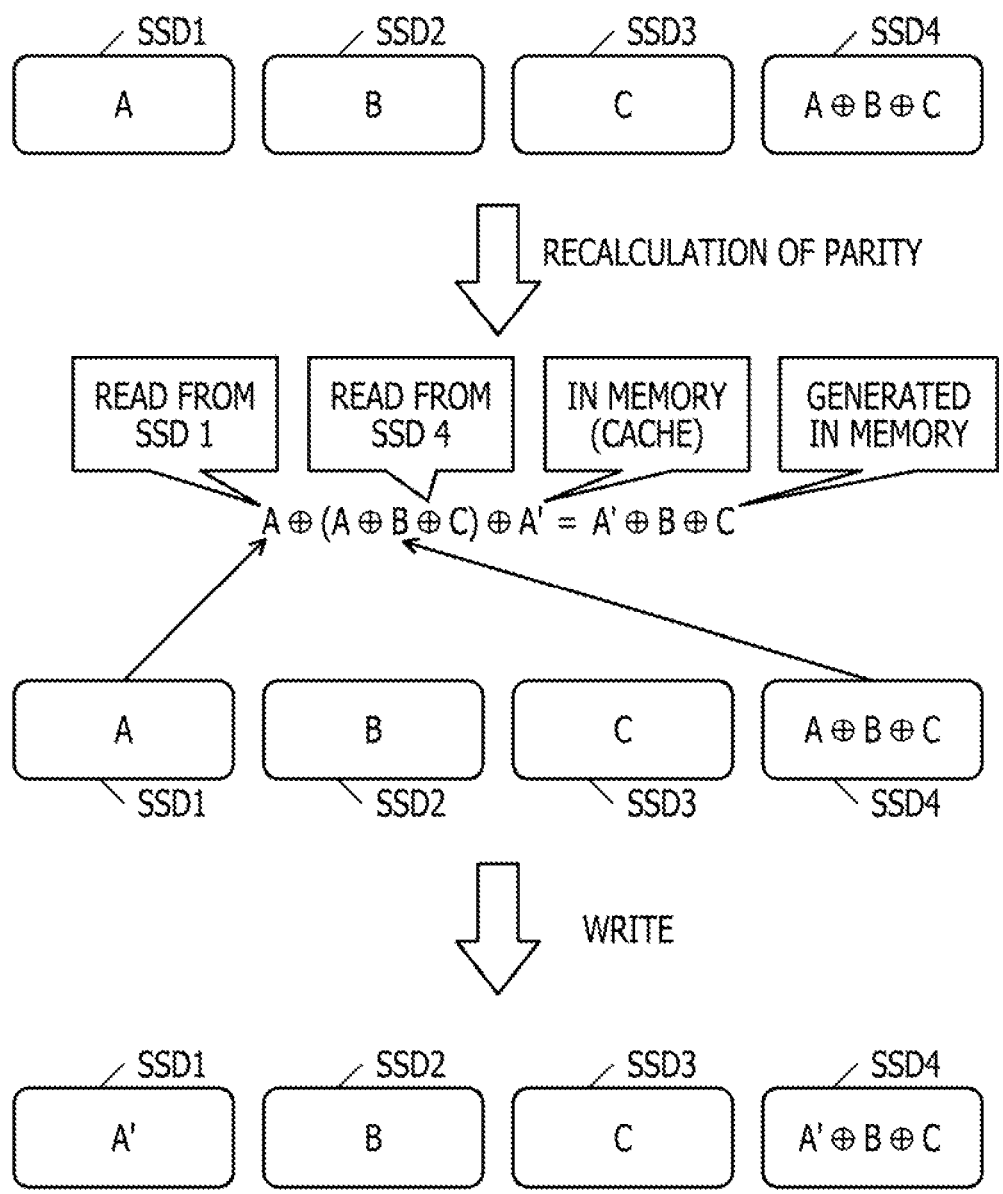
FIG. 3 is a diagram of assistance in explaining reasons for low writing performance of Erasure Coding.

FIG. 3 is a diagram of assistance in explaining reasons for low writing performance of Erasure Coding. Suppose in FIG. 3 that SSDs 1 to 3 store data A to C, respectively, and that an SSD 4 stores parity data AxorBxorC. Then, reasons for low writing performance of Erasure Coding will be illustrated by using an example of updating the data A to A' with reference to FIG. 3.

When updating the data A to A', a device that performs Erasure Coding performs Read-Modify-Write operations for parity data. For example, the foregoing device reads the data A from the SSD 1, reads the parity data AxorBxorC from the SSD 4, uses the data A' in memory as a cache, and generates parity data A'xorBxorC in memory according to the following Equation (1).

$$Axor(AxorBxorC)xorA'=A'xorBxorC \quad (1)$$

The foregoing device then writes the generated parity data to the SSD 4. As a result of the above, processing for one time of data update ends. In contrast to this, Replication merely writes to two storage devices. Hence, the writing performance of Erasure Coding is degraded by an amount corresponding to the reading in the Read-Modify-Write operations and an amount corresponding to the generation of the parity data in the Read-Modify-Write operations.

An example in which the information processing device 101 is applied to a disk array device will next be described with reference to FIG. 4.

Figure 4:
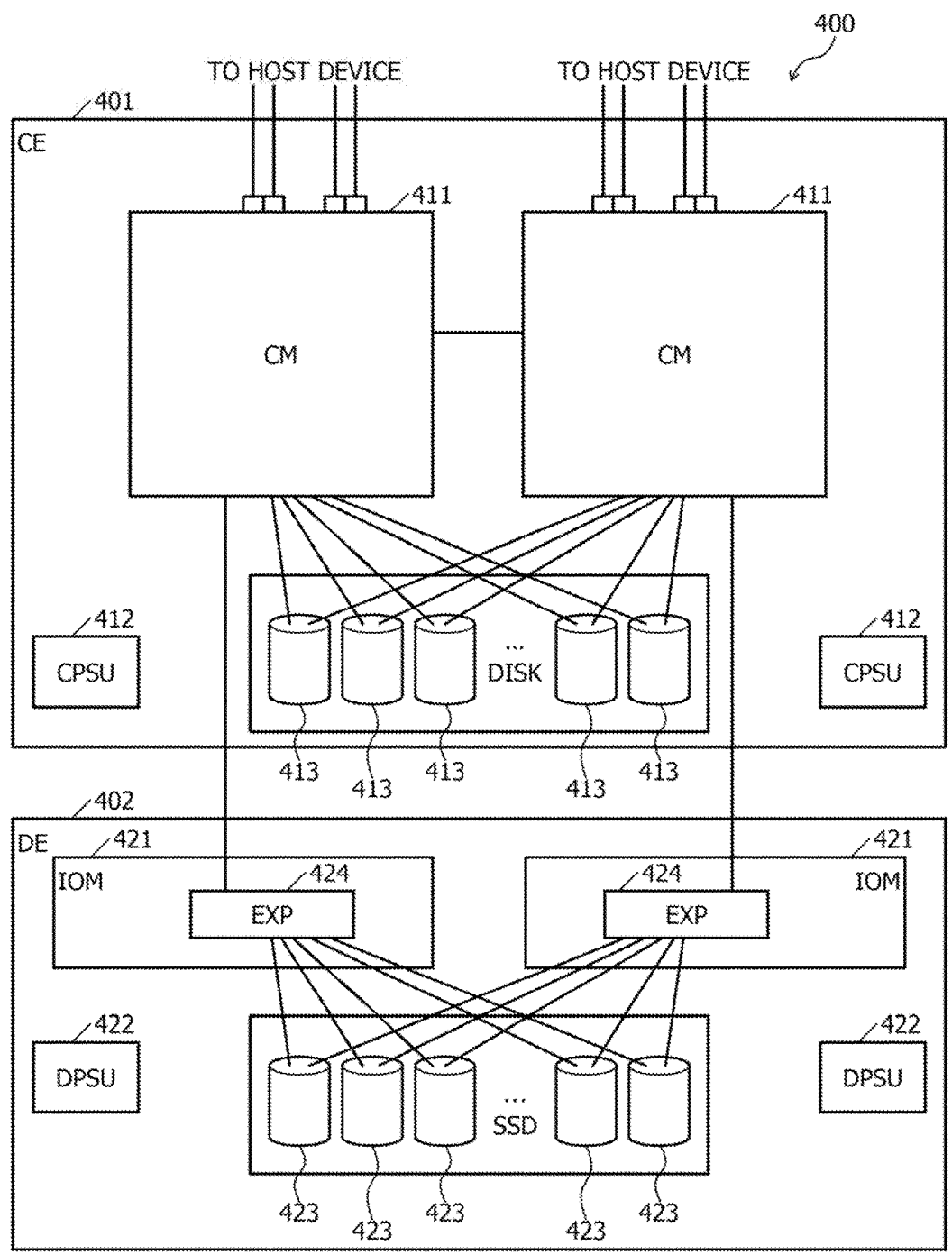
FIG. 4 is a diagram of assistance in explaining an example of hardware configuration of a disk array device 400.

FIG. 4 is a diagram of assistance in explaining an example of hardware configuration of a disk array device 400. The disk array device 400 includes a controller enclosure (CE) 401 and a drive enclosure (DE) 402.

The CE 401 includes CMs 411, CE power supply units (CPSUs) 412, and disks 413. Further, the DE 402 includes input/output (I/O) modules (IOMs) 421, DE power supply units (DPSUs) 422, and SSDs 423. The IOMs 421 include a serial attached small computer system interface (SCSI) (SAS) expander (EXP).

The CMs 411 in this case correspond to the information processing device 101 illustrated in FIG. 1. In addition, the SSDs 423 correspond to the SSDs 1 to 3 illustrated in FIG. 1.

The CE 401 is a casing that includes the CMs 411 to the disks 413. The CMs 411 are devices that control the disk array device 400. In addition, the CMs 411 perform inter-CM communication. In addition, the CMs 411 are coupled to a host device. An internal hardware configuration of a CM 411 will be described with reference to FIG. 5. The CPSUs 412 are units that supply power to the devices within the CE 401. The disks 413 are storage devices used by the CMs 411.

The DE 402 is a casing that includes the IOMs 421 to the SSDs 423. The IOMs 421 are units that perform control between the CMs 411 and the drives. The DPSUs 422 are units that supply power to the devices within the DE 402. The EXPs 424 are expander chips for SAS coupling. The EXPs 424 illustrated in FIG. 4 are coupled to each of the SSDs 423.

Figure 5:
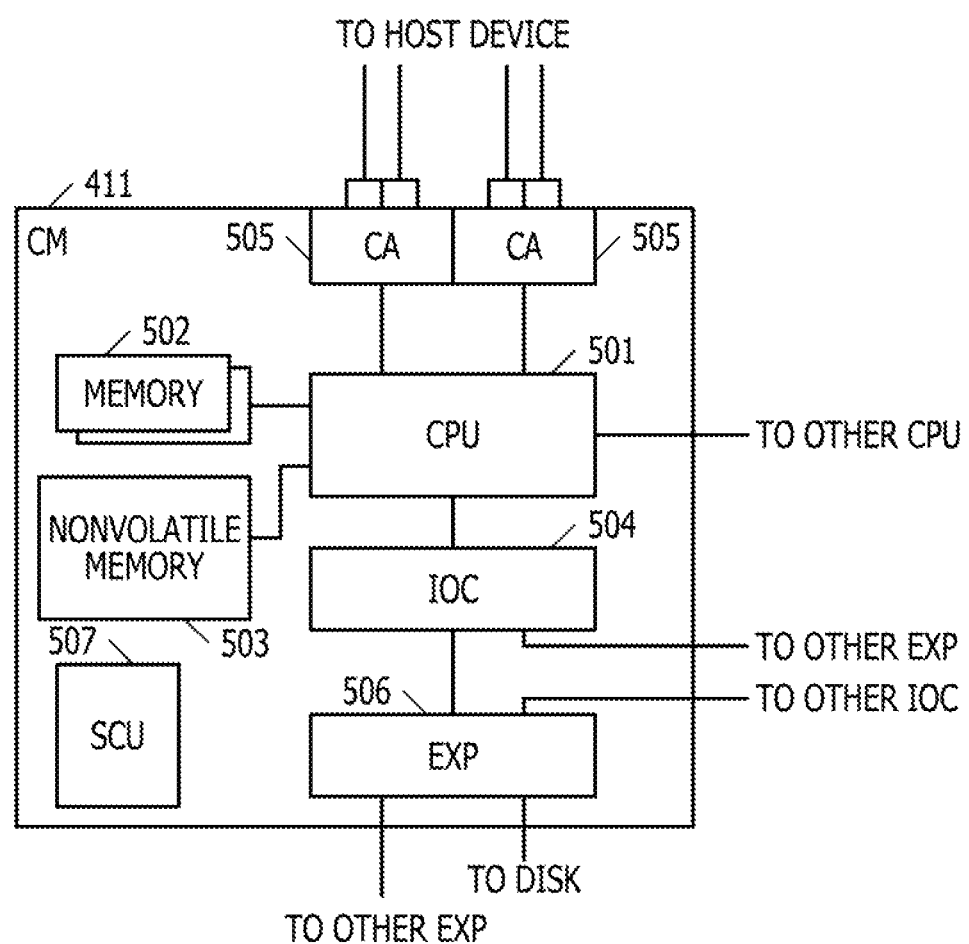
FIG. 5 is a diagram of assistance in explaining an example of hardware configuration of a controller module (CM) 411.

FIG. 5 is a diagram of assistance in explaining an example of hardware configuration of a CM 411. The CM 411 includes a central processing unit (CPU) 501, a memory 502, a nonvolatile memory 503, an I/O controller (IOC) 504, channel adapters (CAs) 505, an EXP 506, and a system capacitor unit (SCU) 507.

The CPU 501 is an arithmetic processing device that controls the whole of the CM 411. In addition, the CPU 501 is coupled to the CPU 501 of the other CM 411. The memory 502 is a volatile memory used as a work area of the CPU 501. The nonvolatile memory 503 is a nonvolatile memory that stores a RAID control program in the present embodiment. A NOR flash memory or a NAND flash memory, for example, may be employed as a storage medium of the nonvolatile memory 503.

The IOC 504 controls I/O from the CPU 501. In the example of FIG. 5, the IOC 504 is coupled to the EXP 506 and the EXP 506 of the other CM 411, and controls I/O from the CPU 501 to the disks 413 and the SSDs 423. The CAs 505 are communication interfaces that communicate with the host device. The EXP 506 is an expander chip for SAS coupling. The EXP 506 illustrated in FIG. 5 is coupled to each of the disks 413 and the EXP 424. The SCU 507 is a unit that supplies power for backing up data in the memory 502 to the nonvolatile memory 503 at a time of a power failure.

Figure 6:
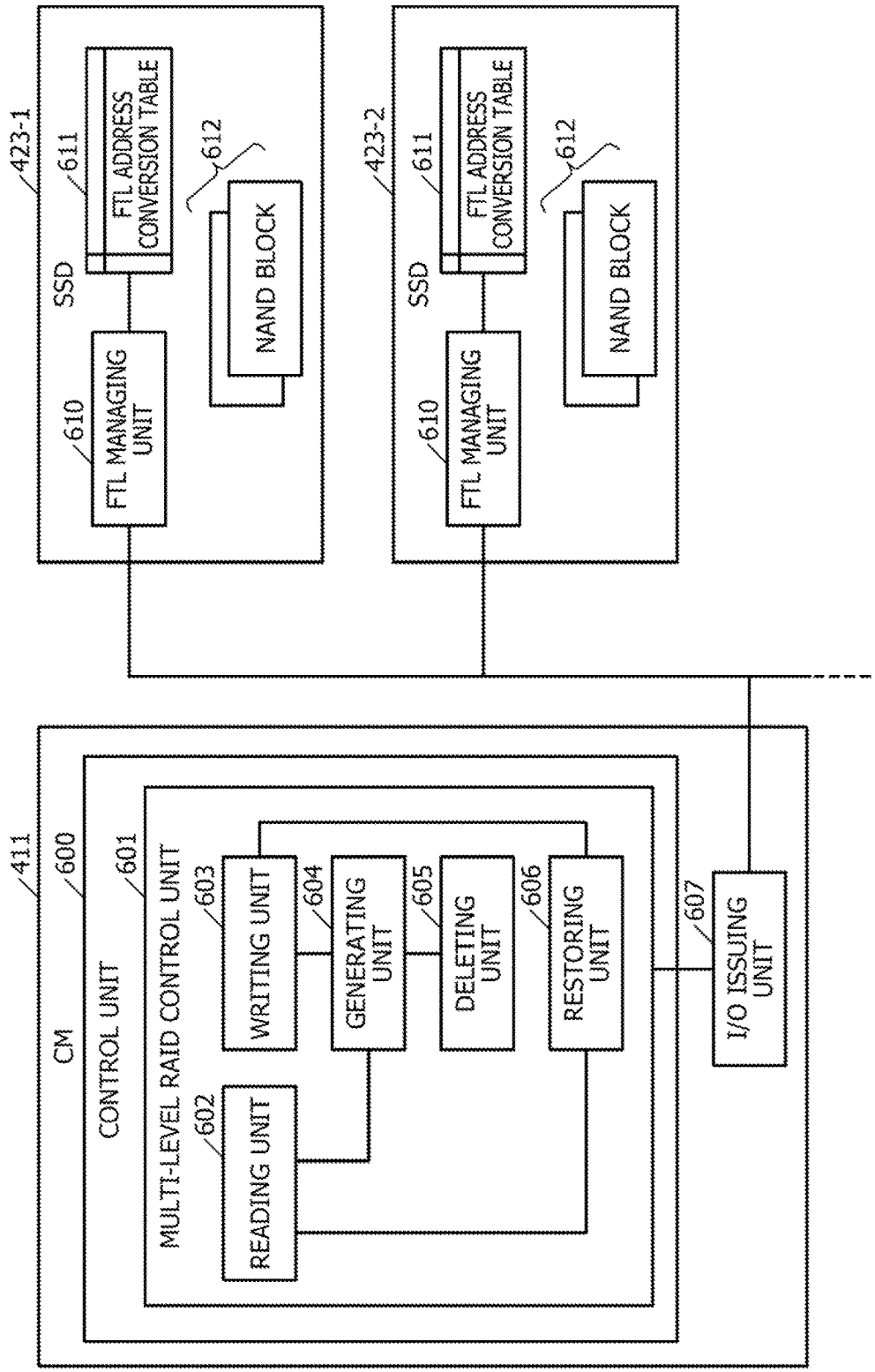
FIG. 6 is a diagram of assistance in explaining an example of functional configuration of the disk array device 400.

FIG. 6 is a diagram of assistance in explaining an example of functional configuration of the disk array device 400. The CM 411 includes a control unit 600 and an I/O issuing unit 607. The control unit 600 includes a Multi-Level RAID control unit 601. The Multi-Level RAID control unit 601 includes a reading unit 602, a writing unit 603, a generating unit 604, a deleting unit 605, and a restoring unit 606. Here, the control unit 600 has functions of the control unit 600 implemented by the CPU 501 by executing a program stored in a storage device. The storage device is, for example, the memory 502, the nonvolatile memory 503, or the disks 413 illustrated in FIG. 5, or the like. In addition, a processing result of each part is stored in the memory 502, a register of the CPU 501, a cache memory of the CPU 501 or the like. In addition, the I/O issuing unit 607 is a function implemented by the IOC 504, the EXP 506, and the EXP 424.

In addition, the SSD 423 includes an FTL managing unit 610, an FTL address conversion table 611, and a plurality of NAND blocks 612. Incidentally, the CM 411 may include the FTL managing unit 610 and the FTL address conversion table 611. In this case, the FTL managing unit 610 has functions of the FTL managing unit 610 implemented by the CPU 501 by executing a program stored in a storage device. The NAND blocks 612 include a plurality of pages as writing units. The FTL address conversion table 611 stores, in association with a logical address, a block number and a page number corresponding to access for I/O and a block number and a page number corresponding to access for recovery. An example of contents stored in the FTL address conversion table 611 will be described with reference to FIG. 7.

Here, the block number and the page number corresponding to access for recovery are used at a time of recovery from Erasure Coding. Hence, "recovery" simply mentioned in the following refers to recovery from Erasure Coding. Incidentally, at a time of recovery from Replication, the CM 411 merely reads from another SSD, and does not use the block number and the page number corresponding to access for recovery.

The Multi-Level RAID control unit 601 performs management for Multi-Level RAID, such as management of Replication destination addresses and determination of whether or not Erasure Coding has already been performed.

The reading unit 602 reads data from the SSDs 423. In addition, the writing unit 603 writes data to the SSDs 423. For example, the reading unit 602 issues a reading request to read data from an SSD 423 to the I/O issuing unit 607, and receives the data corresponding to the reading request, the data being obtained from the I/O issuing unit 607. Similarly, the writing unit 603 issues a writing request to write data to an SSD 423 to the I/O issuing unit 607. Here, when the reading unit 602 and the writing unit 603 issue the reading request and the writing request to the SSDs 423, the reading unit 602 and the writing unit 603 specify access for I/O or access for recovery.

In addition, when the writing unit 603 updates data in one SSD 423 of a RAID group, the writing unit 603 writes data after the update in another storage area different from a storage area in which the data before the update is stored in the one SSD 423.

In addition, when the writing unit 603 updates the data in the one SSD 423, the writing unit 603 writes the data after the update to the other storage area in the foregoing SSD 423, and writes the data after the update to another SSD 423 different from the foregoing SSD 423 in the RAID group.

The generating unit 604 generates parity data of the data after the update based on the data after the update at a time of a start of GC processing of the one SSD 423. For example, the reading unit 602 issues a reading request for I/O to the SSD 423 that starts the GC processing to read the data after the update, and issues a reading request for recovery to the SSD 423 that starts the GC processing to read the data before the update. In addition, the reading unit 602 issues a reading request for recovery to an SSD 423 that stores parity data. Then, from the data before the update, the data after the update, and the parity data read by the reading unit 602, the generating unit 604 generates the parity data of the data after the update. In addition, at the time of the start of the GC processing, the generating unit 604 receives a notification to the effect that the GC processing is to be started from the FTL managing unit 610.

After the parity data of the data after the update is generated, the deleting unit 605 deletes the data after the update written to the other SSD 423 different from the one SSD 423.

In addition, suppose that after the writing of the data after the update, and before the start of the GC processing by the SSD 423 to which the data after the update is written, a failure occurs in an SSD 423 different from the SSD 423 to which the data after the update is written in the RAID group. In this case, as recovery from Erasure Coding, the restoring unit 606 restores data in the failed SSD 423 based on the data before the update in the SSD 423 to which the data after the update is written and the parity data of the data before the update.

In addition, when a failure occurs in the foregoing one SSD 423 to which the data after the update is written, the restoring unit 606 restores the data before the update based on data and the parity data in the SSDs 423 excluding the foregoing one SSD 423 to which the data after the update is written in the RAID group. In addition, at this time, as recovery from Replication, the restoring unit 606 restores the data after the update by reading the data after the update which data is written to the other SSD 423 different from the foregoing one SSD 423 to which the data after the update is written in the RAID group. Incidentally, the restoring unit 606 writes the restored data to, for example, an SSD 423 substituted for the failed SSD 423 or an SSD 423 designated as a hot spare in the RAID group including the failed SSD 423.

The I/O issuing unit 607 specifies whether reading requests from the reading unit 602 and writing requests from the writing unit 603 are for access for I/O or access for recovery, and issues the reading requests and the writing requests to the FTL managing units 610 of the corresponding SSDs 423. As an example of a method of specifying access for I/O or access for recovery, the I/O issuing unit 607, for example, adds a tag specifying access for I/O or access for recovery to the reading requests and the writing requests.

The FTL managing unit 610 receives I/O from the I/O issuing unit 607, refers to the FTL address conversion table 611, and accesses the NAND blocks 612. In addition, the FTL managing unit 610 performs GC processing. In addition, when performing GC processing, the FTL managing unit 610 notifies the CM 411 that GC processing will hereafter be started.

Figure 7:
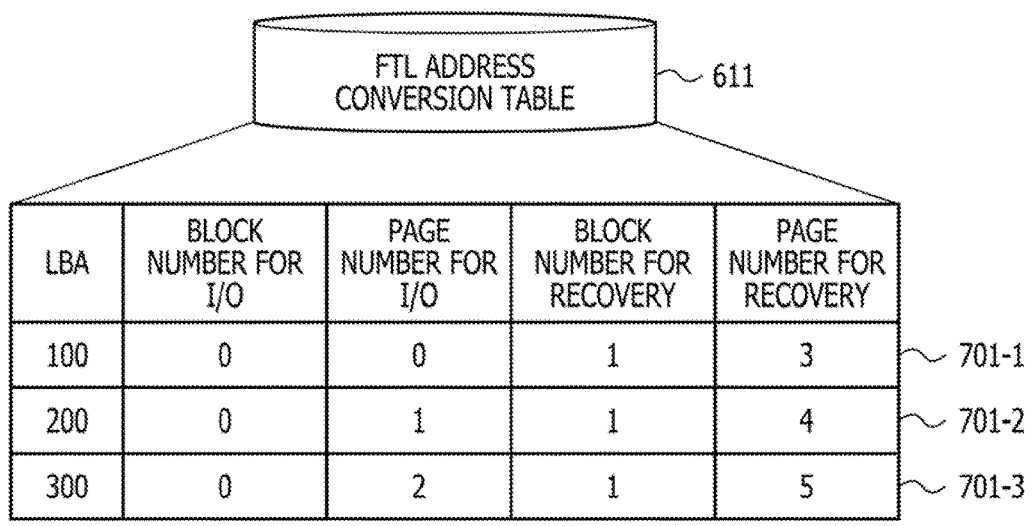
FIG. 7 is a diagram of assistance in explaining an example of contents stored in a flash translation layer (FTL) address conversion table 611.

FIG. 7 is a diagram of assistance in explaining an example of contents stored in the FTL address conversion table 611. The FTL address conversion table 611 illustrated in FIG. 7 includes records 701-1 to 3. The FTL address conversion table 611 includes fields of a logical block addressing (LBA), a block number for I/O, a page number for I/O, a block number for recovery, and a page number for recovery.

The LBA field stores a value indicating a logic LBA for access from the CM 411. The I/O block number field stores a value indicating a block number for I/O which block number corresponds to the LBA. The I/O page number field stores a value indicating a page number for I/O which page number corresponds to the LBA. The recovery block number field stores a value indicating a block number for recovery which block number corresponds to the LBA. The recovery page number field stores a value indicating a page number for recovery which page number corresponds to the LBA. Incidentally, the block number and the page number for recovery are used at a time of recovery from Erasure Coding. At a time of recovery from Replication, the CM 411 merely reads from another SSD, and does not use the block number for recovery nor the page number for recovery.

Figure 9:
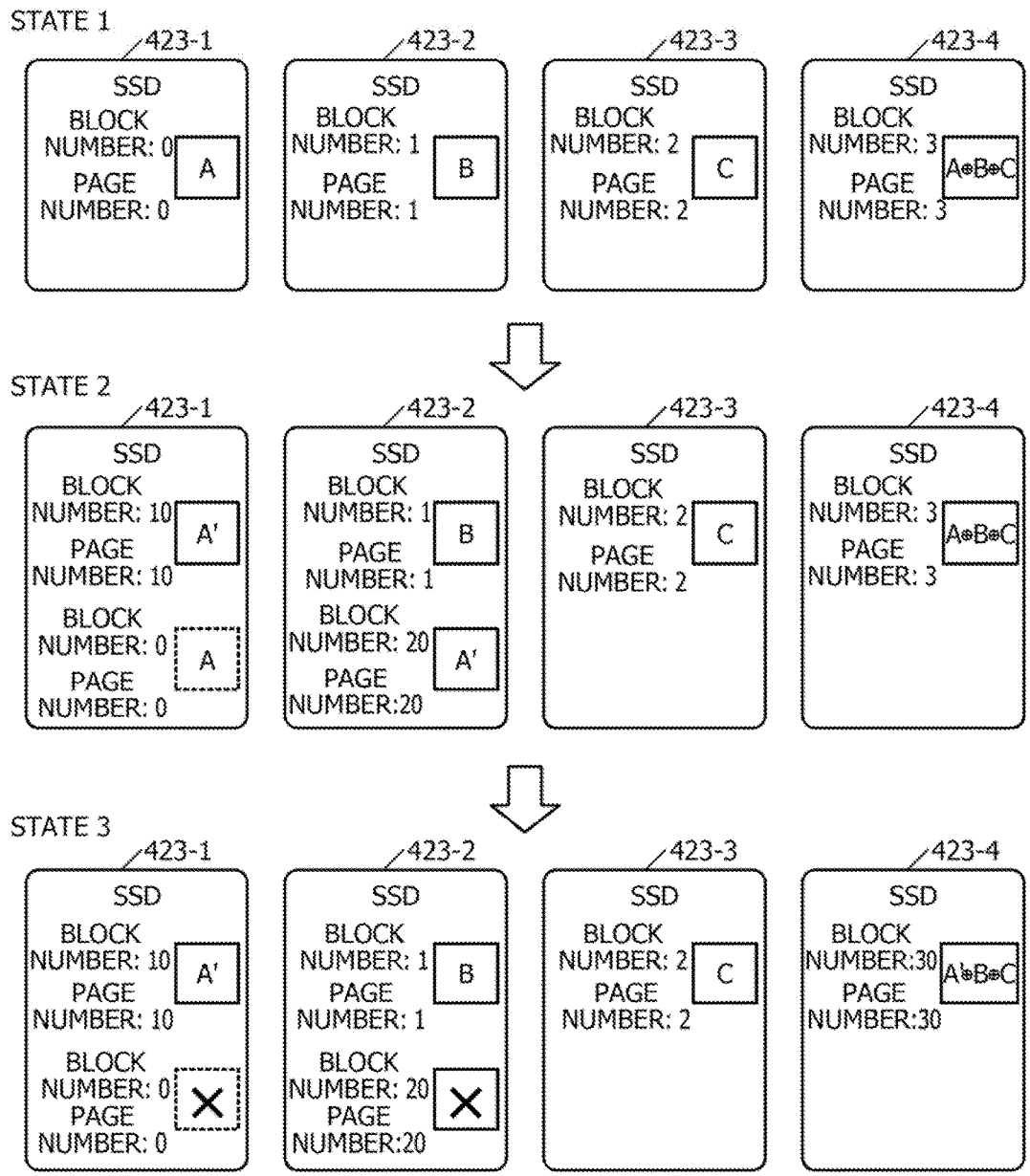
FIG. 9 is a diagram of assistance in explaining an example of update of solid state drives (SSDs) 423-1 to 4 at a time of data update.

Next, referring to FIGS. 8 and 9, description will be made of an example of update of the FTL address conversion tables 611 at a time of data update and an example of update of SSDs which update corresponds to the update of the FTL address conversion tables 611 at the time of the data update. In addition, referring to FIGS. 10 and 11, description will be made of an example of update of the FTL address conversion tables 611 at a time of recovery and an example of update of the SSDs which update corresponds to the update of the FTL address conversion tables 611 at the time of the recovery. In addition, suppose that states 1 illustrated in FIGS. 8 to 11 are identical to each other, and that states 2 illustrated in FIGS. 8 to 11 are identical to each other.

FIG. 8 is a diagram of assistance in explaining an example of update of the FTL address conversion tables 611 at a time of data update. FIG. 9 is a diagram of assistance in explaining an example of update of SSDs 423-1 to 4 at the time of the data update. Here, tables 801 to 803 illustrated in FIG. 8 respectively associate "1 to 4" as identifiers (IDs) of the SSDs 423-1 to 4 in states 1 to 3 with contents stored in the FTL address conversion tables 611. The tables 801 to 803 illustrated in FIG. 8 include records 801-1 to 4, records 802-1 to 5, and records 803-1 to 4, respectively.

First, with regard to the state 1, as indicated by the record 801-1, the SSD 423-1 stores data A at a physical LBA indicated by a block number 0 and a page number 0 that correspond to an LBA 100. In addition, as indicated by the record 801-2, the SSD 423-2 stores data B at a physical LBA indicated by a block number 1 and a page number 1 that correspond to an LBA 100. In addition, as indicated by the record 801-3, the SSD 423-3 stores data C at a physical LBA indicated by a block number 2 and a page number 2 that correspond to an LBA 100. Further, as indicated by the record 801-4, the SSD 423-4 stores AxorBxorC as parity data at a physical LBA indicated by a block number 3 and a page number 3 that correspond to an LBA 100. In addition, as indicated by the record 801-4, because parity data is not used at times of I/O, no values are entered in the I/O block number and page number fields of the record 801-4.

The state 2 is a state in which the data A has been updated by in-place update to A' from the state 1. The SSD 423-1 writes the data A' to a physical LBA assigned for the data A' according to an instruction of the CM 411. In the example of FIG. 9, the physical LBA assigned for the data A' is a physical LBA indicated by a block number 10 and a page number 10. Then, as indicated by the record 802-1 as a state after the update of the record 801-1, the SSD 423-1 updates the block number and the page number for I/O to the block number 10 and the page number 10 indicating the physical LBA assigned for the data A'. Here, the SSD 423-1 does not update the block number and the page number for recovery of the record 802-1.

In addition, according to an instruction of the CM 411, the SSD 423-2 writes the data A' to a physical LBA assigned as a Replication destination of the data A'. In the example of FIG. 9, the physical LBA assigned for the data A' is a physical LBA indicated by a block number 20 and a page number 20. Then, as indicated by the record 802-3, the SSD 423-2 updates a block number and a page number for I/O which numbers correspond to an LBA 200 to the block number 20 and the page number 20 indicating the physical LBA assigned for the data A'. Here, the data A' written to the SSD 423-2 is not used for recovery from Erasure Coding. Hence, the SSD 423-2 leaves a block number and a page number for recovery of the record 802-3 in a blank state.

The state 3 is a state in which Erasure Coding has been performed from the state 2. Here, in order to generate new parity data, the CM 411 reads present parity data, the data before the update, and the data after the update. In the example of FIGS. 8 and 9, the CM 411 reads A and A' from the SSD 423-1, and reads AxorBxorC from the SSD 423-4. Then, the CM 411 generates A'xorBxorC as parity data by performing Axor(AxorBxorC)xorA'.

Then, according to an instruction of the CM 411, the SSD 423-4 writes the parity data A'xorBxorC generated by the CM 411. In the example of FIG. 9, a physical LBA assigned for the parity data A'xorBxorC is a physical LBA indicated by a block number 30 and a page number 30. Next, as indicated by the record 803-4, the SSD 423-4 updates the block number and the page number for recovery which numbers correspond to the LBA 100 to the block number 30 and the page number 30 indicating the physical LBA assigned for the parity data A'xorBxorC.

In addition, according to an instruction of the CM 411, the SSD 423-1 copies the block number and the page number for I/O for the data after the update to the block number and the page number for recovery. For example, as indicated by the record 803-1, the SSD 423-1 copies the block number 10 for I/O and the page number 10 for I/O to the block number and the page number for recovery. In addition, because Erasure Coding is performed, the SSD 423-1 deletes the data A before the update by garbage collection processing. In addition, because the Replication of the data A' becomes unnecessary, the SSD 423-2 deletes the data A'.

Figure 11:
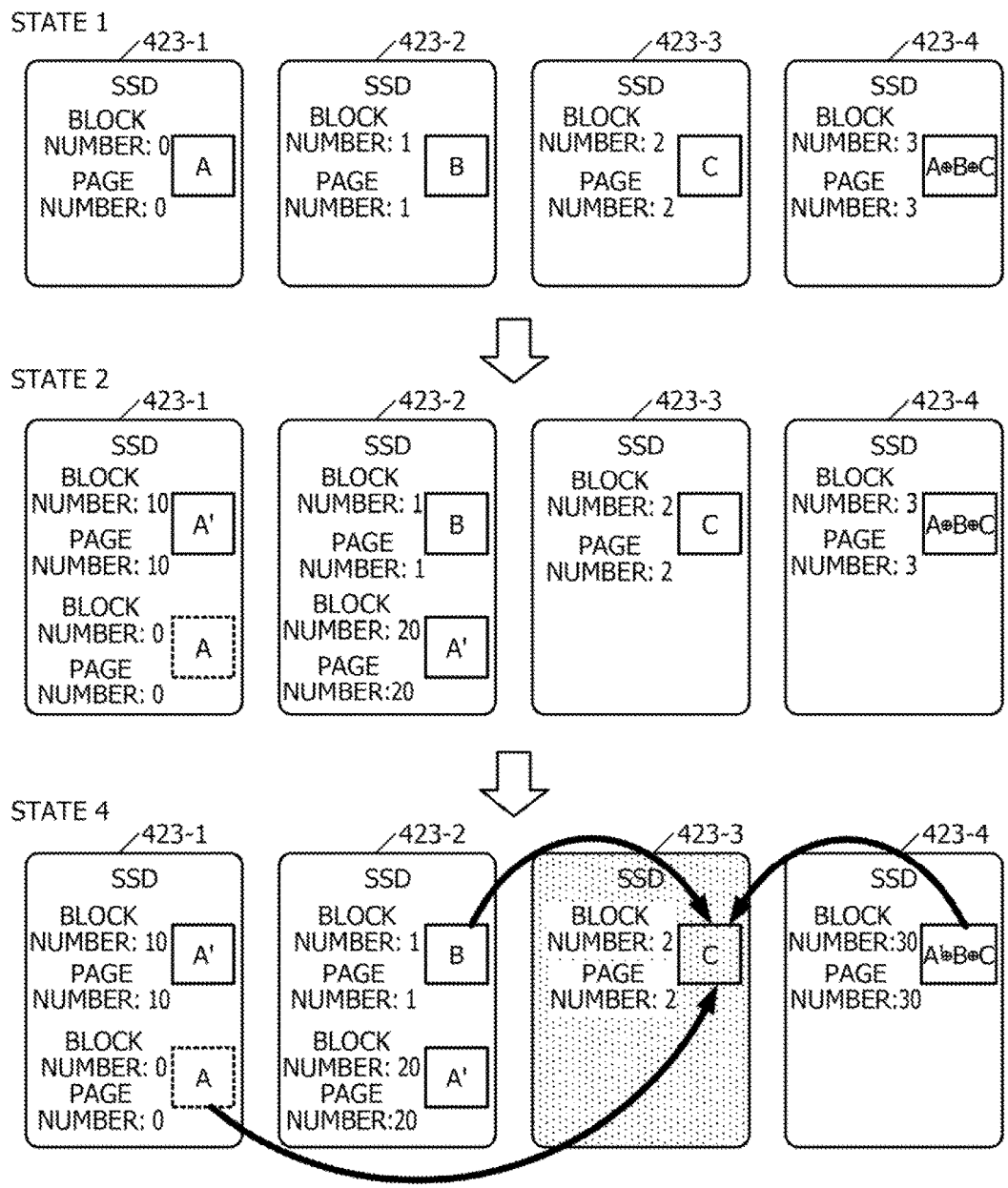
FIG. 11 is a diagram of assistance in explaining an example of update of the SSDs 423-1 to 4 at a time of recovery.

FIG. 10 is a diagram of assistance in explaining an example of update of the FTL address conversion tables 611 at a time of recovery. FIG. 11 is a diagram of assistance in explaining an example of update of the SSDs 423-1 to 4 at the time of the recovery. Here, tables 801 and 802 illustrated in FIG. 10 are respectively identical to the tables 801 and 802 illustrated in FIG. 8, and therefore description will be omitted. A table 1001 illustrated in FIG. 10 associates the IDs of the SSDs in a state 4 with contents stored in the FTL address conversion tables 611. The table 1001 illustrated in FIG. 8 includes records 1001-1 to 5.

The state 4 is a state in which a failure occurs in the SSD 423-3 from the state 2. In this case, the CM 411 reads the block numbers and the page numbers for recovery in the SSDs 423-1, 2, and 4, and restores the data stored by the SSD 423-3. For example, the CM 411 reads the data A stored at the physical LBA assigned for the block number 0 and the page number 0 of the LBA 100 from the SSD 423-1. Similarly, the CM 411 reads the data B from the SSD 423-2, and reads the parity data AxorBxorC from the SSD 423-4. The CM 411 then restores the data C by performing AxorBxor(AxorBxorC).

Processing performed by the disk array device 400 will next be described with reference to FIGS. 12 to 14.

Figure 12:
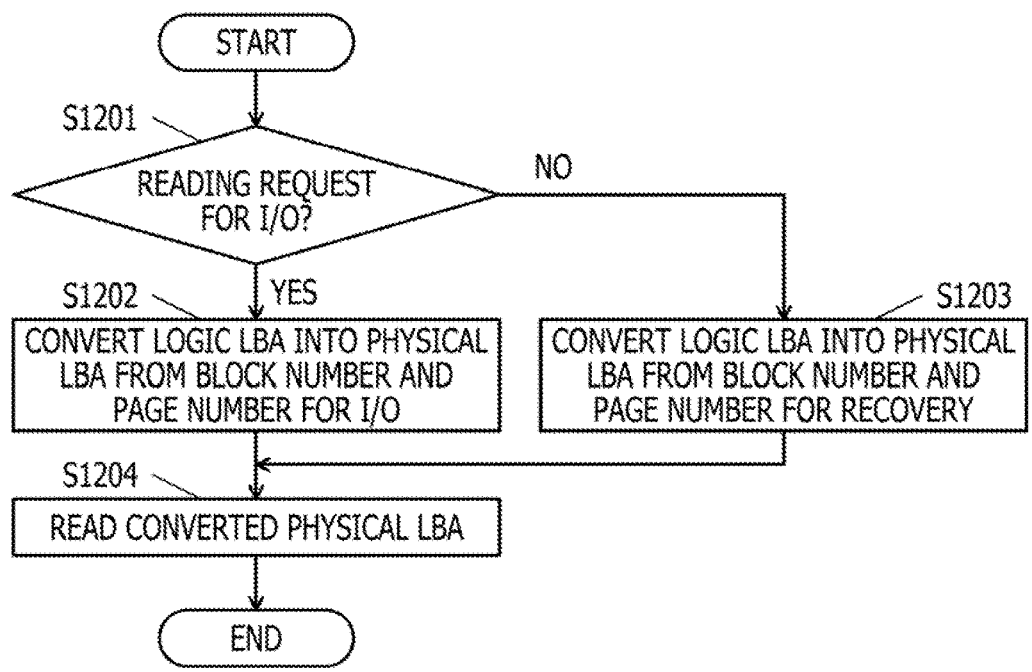
FIG. 12 is a flowchart illustrating an example of a reading processing procedure.

FIG. 12 is a flowchart illustrating an example of a reading processing procedure. Reading processing is performed when a reading request from the CM 411 is received. The SSD 423 determines whether or not the received reading request is a reading request for I/O (step S1201). In this case, for example, the SSD 423 may determine whether or not the received reading request is a reading request for I/O by referring to a tag that is included in the reading request and which indicates access for I/O or access for recovery.

In the case of a reading request for I/O (step S1201: Yes), the SSD 423 converts a logic LBA into a physical LBA from a block number and a page number for I/O (step S1202). In the case of a reading request for recovery (step S1201: No), on the other hand, the SSD 423 converts the logic LBA into a physical LBA from a block number and a page number for recovery (step S1203).

After completing the processing of step S1202 or step S1203, the SSD 423 reads data from the converted physical LBA (step S1204). The SSD 423 next transmits the read data to the CM 411. The CM 411 and the SSD 423 thereby end the reading processing.

Figure 13:
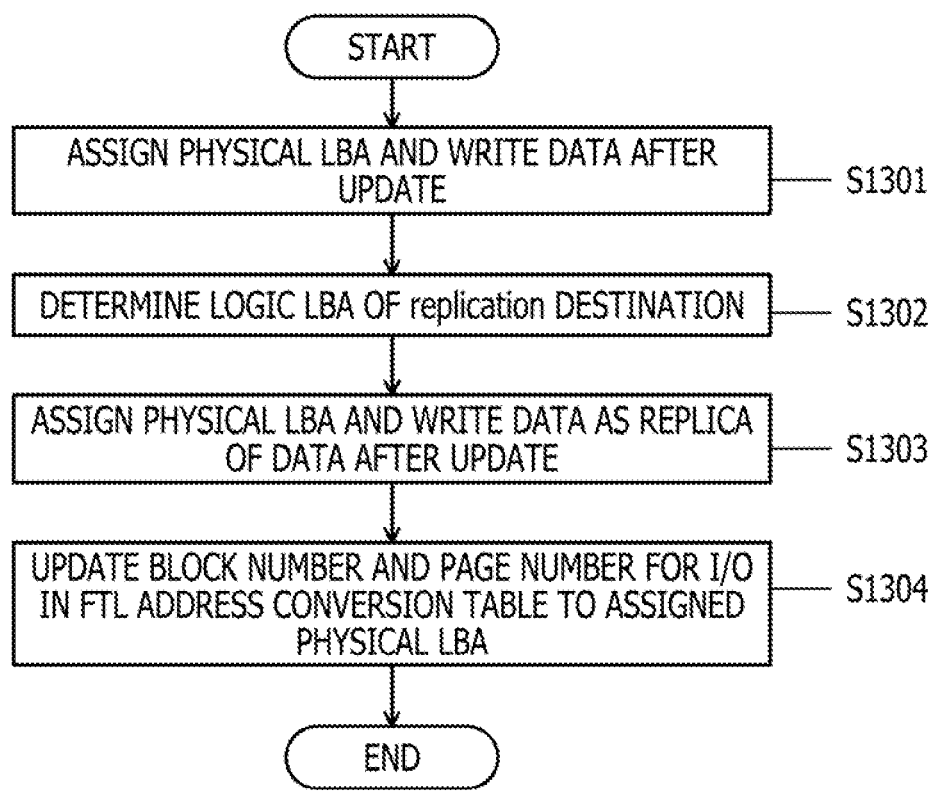
FIG. 13 is a flowchart illustrating an example of a processing procedure for in-place update of Erasure Coded data.

FIG. 13 is a flowchart illustrating an example of a processing procedure for in-place update of Erasure Coded data. The SSD 423 receives a writing request for I/O from the CM 411, assigns a physical LBA, and writes data after the update at the physical LBA (step S1301). Here, the writing destination is the same SSD as the SSD 423 that stores data before the update. Then, the SSD 423 assigns the physical LBA of another region than a region that stores the data before the update, and writes the data after the update at the physical LBA.

Next, the CM 411 determines the logic LBA of a Replication destination (step S1302). For example, in the example of the state 2 in FIG. 8, as opposed to the logic LBA of the LBA 100 in the SSD 423-1, a logic LBA of 200 of the Replication destination in the SSD 423-2 is determined. In addition, the logic LBA determined here is a logic LBA of the SSD 423 different from the SSD 423 that stores the data before the update.

The CM 411 transmits a writing request for I/O to the determined address to the SSD 423. Receiving the writing request, the SSD 423 assigns a physical LBA, and writes data as a replica (step S1303) at the physical LBA. Then, the SSD 423 updates a block number and a page number for I/O in the FTL address conversion table 611 to the assigned physical LBA (step S1304). Here, the SSD 423 does not update a block number and a page number for recovery. After completing the processing of step S1304, the CM 411 and the SSD 423 end the in-place update processing of the Erasure Coded data.

Figure 14:
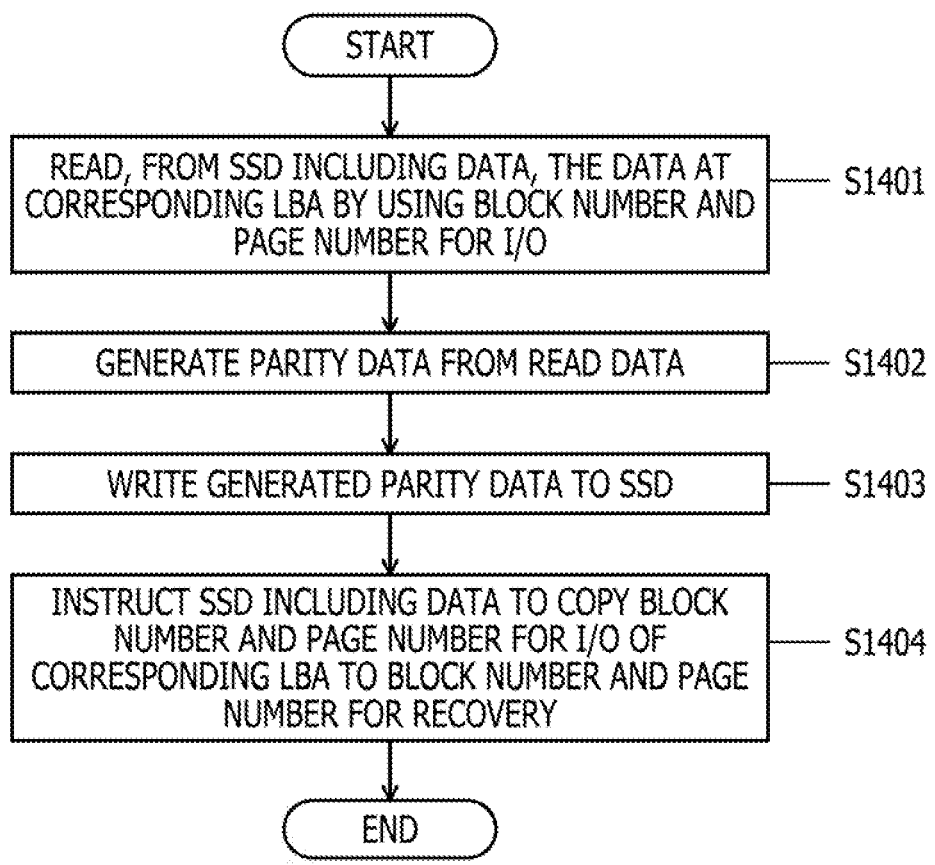
FIG. 14 is a flowchart illustrating an example of an Erasure Coding processing procedure.

FIG. 14 is a flowchart illustrating an example of an Erasure Coding processing procedure. The CM 411 reads, from an SSD 423 including data, the data at a corresponding LBA by using a block number and a page number for I/O (step S1401). For example, the CM 411 transmits a reading request for I/O of the data at the corresponding LBA to the SSD 423 including the data. Receiving the reading request, the SSD 423 reads the corresponding data using the block number and the page number for I/O in the FTL address conversion table 611, and transmits the data to the CM 411.

Next, the CM 411 generates parity data from the read data (step S1402). Then, the CM 411 writes the generated parity data to an SSD 423 (step S1403). For example, the CM 411 transmits a writing request for recovery, the writing request including the generated parity data, to the SSD 423. Receiving the writing request, the SSD 423 writes the parity data to a physical LBA indicated by a block number and a page number for recovery in the FTL address conversion table 611.

In addition, the CM 411 instructs the SSD 423 including the data to copy the block number and the page number for I/O of the corresponding LBA to the block number and the page number for recovery (step S1404). Receiving the instruction, the SSD 423 copies the block number and the page number for I/O of the corresponding LBA to the block number and the page number for recovery. After completing the processing of step S1404, the CM 411 and the SSD 423 end the Erasure Coding processing.

Next, an example of effects of the RAID control method according to the present embodiment will be described with reference to FIG. 15, and an example of update of Erasure Coded data will be described as a conventional technique with reference to FIG. 16. Here, suppose that in a state 1 illustrated in FIGS. 15 and 16, the SSDs 423-1 to 3 store the data A to C, respectively, and the SSD 423-4 stores the parity data AxorBxorC. The effects of the present embodiment will be described with reference to FIGS. 15 and 16 by using an example of updating the data A.

Figure 15:
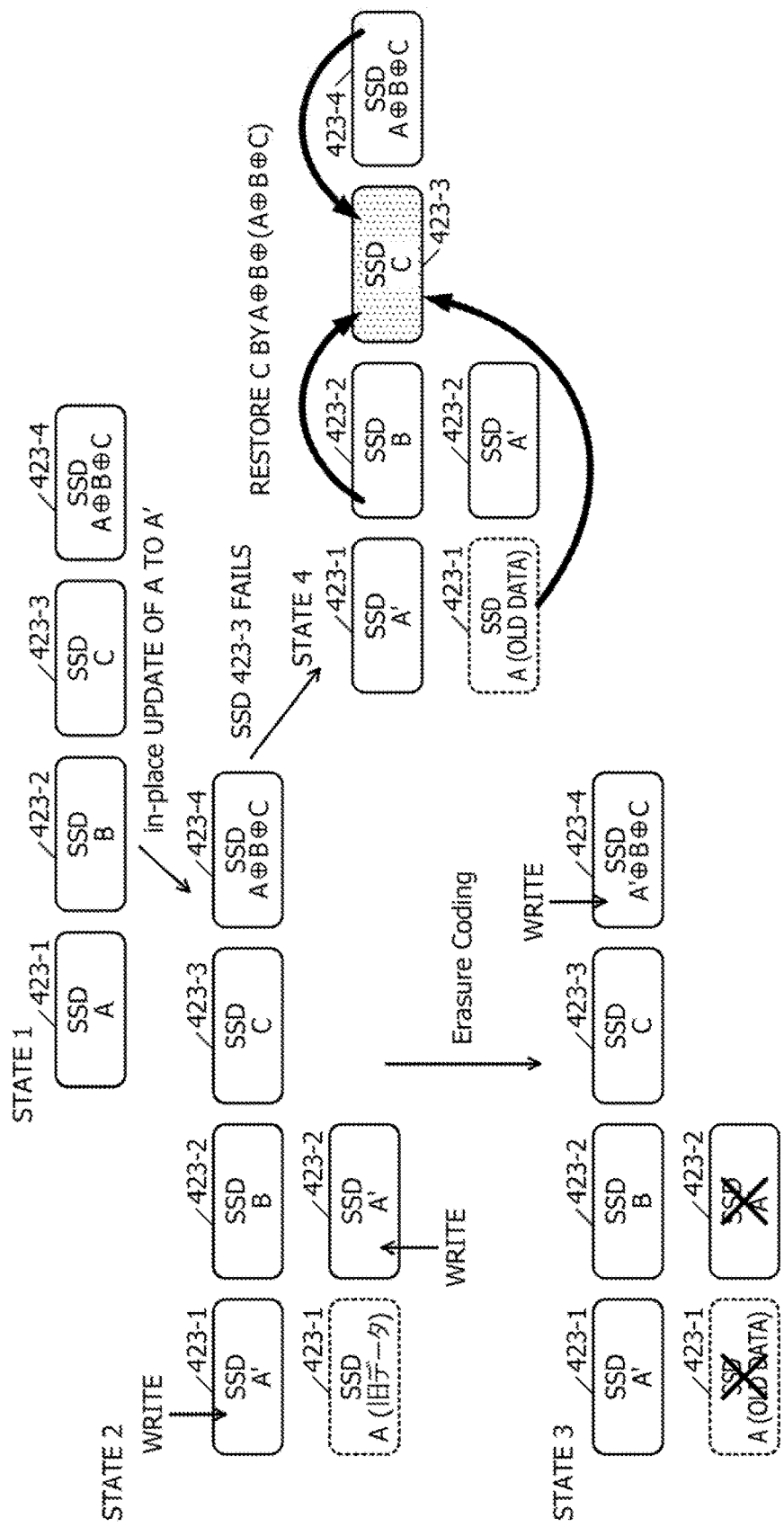
FIG. 15 is a diagram of assistance in explaining an example of effects of a RAID control method according to the present embodiment.

FIG. 15 is a diagram of assistance in explaining an example of effects of the RAID control method according to the present embodiment. The state 1 illustrated in FIG. 15 is changed to a state 2 when A is updated to A' by in-place update. At this time, the CM 411 writes A' to the SSD 423-1, and writes A' to the SSD 423-2. Then, the CM 411 does not perform parity update. Thus, because parity update is not performed, writing performance at substantially same level as that of Replication is achieved.

Then, the state 2 is changed to a state 3 when Erasure Coding is performed. At this time, the CM 411 writes parity data A'xorBxorC to the SSD 423-4. As a result of the above, the CM 411 may reduce four times of writing occurring at a time of Replication to three times of writing in the states 2 and 3. Hence, the CM 411 may realize writing performance substantially equal to that of Replication and a small number of times of writing at the same time.

In addition, the state 2 is changed to a state 4 when a failure occurs in the SSD 423-3. At this time, the CM 411 reads A from the SSD 423-1, reads B from the SSD 423-2, and reads the parity data AxorBxorC from the SSD 423-4, and restores C.

Figure 16:
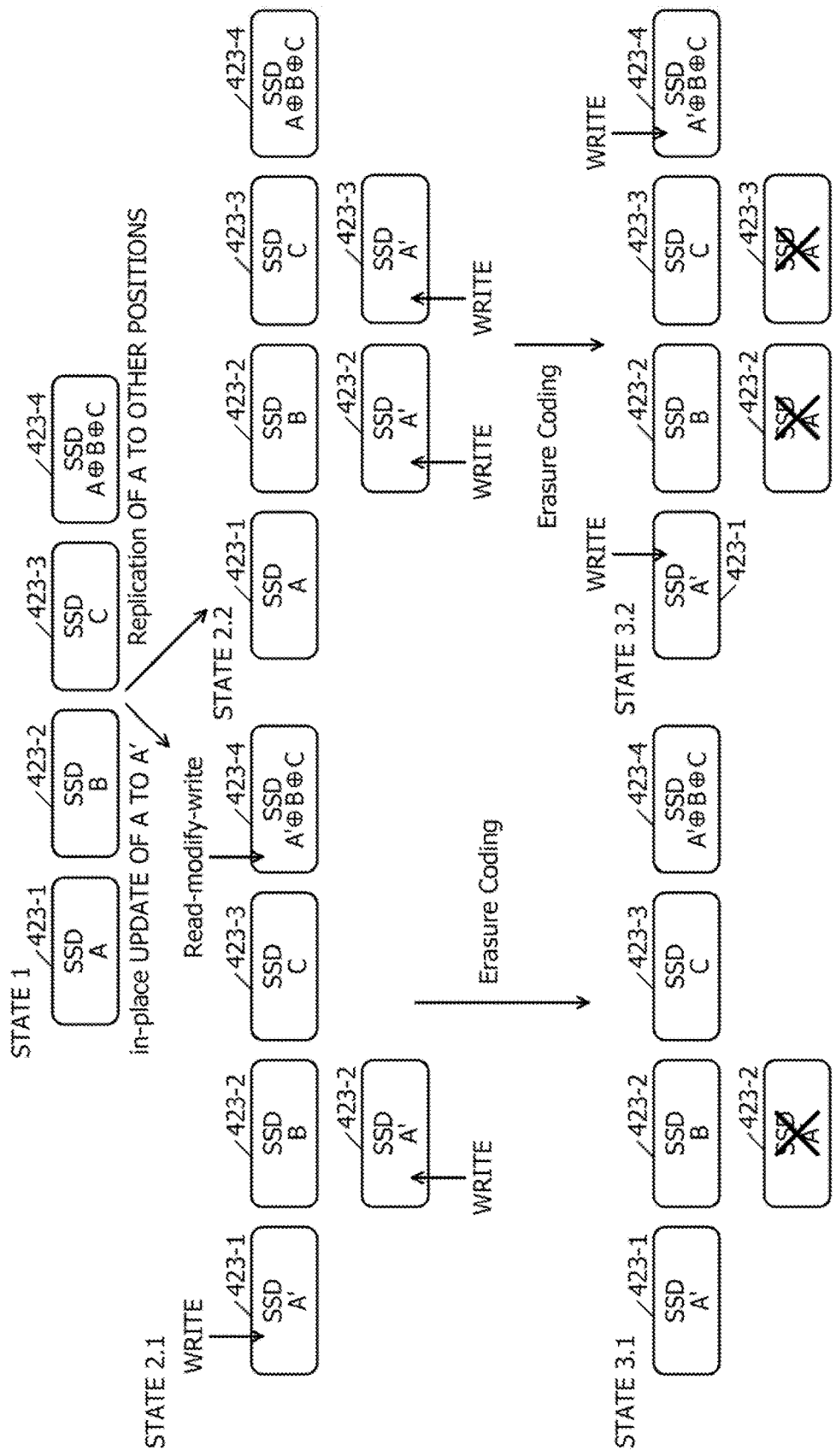
FIG. 16 is a diagram of assistance in explaining an example of update of Erasure Coded data.

FIG. 16 is a diagram of assistance in explaining an example of update of Erasure Coded data. FIG. 16 illustrates, as two methods of conventional techniques, a method of in-place update as a first method and a method of Replication to another SSD as a second method.

First, with regard to the first method, the state 1 is changed to a state 2.1 when A is updated to A' by in-place update. At this time, a device that performs the in-place update writes the data A' to the SSD 423-1, writes the data A' to the SSD 423-2, and writes the parity data A'xorBxorC to the SSD 423-4. In this case, because Read-Modify-Write operations occur to write the parity data A'xorBxorC, writing performance is at substantially same level as that of Erasure Coding. In addition, the state 2.1 is changed to a state 3.1 when Erasure Coding is performed.

In addition, with regard to the second method, the state 1 is changed to a state 2.2 when A is replicated to another SSD. At this time, a device that performs the Replication writes the data A' to the SSDs 423-2 and 3. Next, the state 2.2 is changed to a state 3.2 when Erasure Coding is performed. At this time, the foregoing device writes the data A' to the SSD 423-1, and writes the parity data A'xorBxorC to the SSD 423-4. Thus, in the states 2.2 and 3.2, the number of times of writing is increased from three to four, and therefore writing performance is degraded.

As described above, when the CM 411 updates data in one SSD 423 within a RAID group, the CM 411 writes data after the update to a region different from a region that stores the data before the update in the one SSD 423, and does not generate parity data. Then, the CM 411 generates parity data from the data after the update at a time of a start of GC processing, and writes the generated parity data. The CM 411 may thereby reduce the number of times of writing parity, and may therefore improve writing performance.

In addition, when the CM 411 updates the one SSD 423 within the RAID group, the CM 411 writes the data after the update to another SSD 423 different from the one SSD 423. Thus, even when a failure occurs in the one SSD 423, the CM 411 may perform recovery from Replication, for example, read the data after the update from the other SSD 423.

In addition, after generating the parity data of the data after the update, the CM 411 deletes the data after the update which data is written to the other SSD 423 different from the one SSD 423. Thus, the CM 411 may increase the free space of the SSD 423 by deleting the unnecessary data.

In addition, suppose that after the writing of the data after the update, and before a start of GC processing by the SSD 423 to which the data after the update is written, a failure occurs in an SSD 423 different from the SSD 423 to which the data after the update is written in the RAID group. In this case, the CM 411 restores data in the failed SSD 423 based on the data before the update in the SSD 423 to which the data after the update is written and the parity data of the data before the update. For example, in the example of FIG. 11, even when a failure occurs in the SSD 423-3, the CM 411 restores C in the SSD 423-3 from the data A and B and the parity data AxorBxorC in the SSDs 423-1, 2, and 4. The CM 411 may thus perform recovery from Erasure Coding by using the old data not deleted until the GC processing.

Incidentally, the RAID control method described in the present embodiment may be implemented by executing a program prepared in advance in a computer such as a personal computer, a workstation or the like. The present RAID control program is recorded on a computer readable recording medium such as a hard disk, a flexible disk, a compact disc-read only memory (CD-ROM), a digital versatile disk (DVD) or the like, and is executed by being read from the recording medium by the computer. The present RAID control program may also be distributed via a network such as the Internet or the like.

In addition, the FTL managing unit 610 described in the present embodiment may also be implemented by an application specific integrated circuit (IC) (hereinafter referred to simply as an "ASIC") such as a standard cell, a structured ASIC or the like, or a programmable logic device (PLD) such as a field programmable gate array (FPGA) or the like. For example, the FTL managing unit 610 may be manufactured by providing a functional definition of the above-described FTL managing unit 610 by hardware description language (HDL) descriptions, performing logic synthesis of the HDL descriptions, and providing a result of the logic synthesis to an ASIC or a PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control device for a storage apparatus including a first storage device, a second storage device, and a third storage device, the control device comprising:
a memory; and
a processor coupled to the memory and configured to:
store, in the third storage device, first parity data generated based on first data stored in the first storage device and second data stored in the second storage device,
store, in the first storage device, third data as update data of the first data,
execute reading the first data and the third data from the first storage device and reading the first parity data from the third storage device when garbage collection for the first storage device is performed, and
execute generating second parity data based on the read first data, the read third data, and the read first parity data.

2. The control device according to claim 1, wherein the processor is further configured to store, in the third storage device, the second parity data.

3. The control device according to claim 1, wherein the first data is stored in a first storage area of the first storage device, and
the third data is stored in a second storage area different from the first storage area of the first storage device.

4. The control device according to claim 1, wherein the storage apparatus includes a plurality of storage devices including the first storage device, the second storage device, and the third storage device, and
the processor is further configured to store the third data in any one storage device different from the first storage device among the plurality of storage devices.

5. The control device according to claim 4, wherein the processor is further configured to delete the third data stored in the anyone storage device after generating the second parity data.

6. The control device according to claim 1, wherein the processor is further configured to, when a failure occurs in the second storage device before the second parity data is generated, restore the second data stored in the second storage device based on the first data stored in the first storage device and the first parity data stored in the third storage device.

7. The control device according to claim 1, wherein the processor is further configured to:
when a failure occurs in the second storage device after the second parity data is generated, restore the second data stored in the second storage device based on the third data stored in the first storage device and the second parity data stored in the third storage device, and
when a failure occurs in the first storage device after the second parity data is generated, restore the third data stored in the first storage device based on the second data stored in the second storage device and the second parity data stored in the third storage device.

8. The control device according to claim 1, wherein the processor is further configured to receive, from the first storage device, a notification indicating that the first storage device is to start the garbage collection, and
the reading the first data and the third data, the reading the first parity data, and the generating the second parity data are executed in response to the notification.

9. The control device according to claim 1, wherein the first data stored in the first storage device is deleted by performing of the garbage collection.

10. The control device according to claim 1, wherein the first storage device, the second storage device, and the third storage device are included in a redundant array of inexpensive disks (RAID) group.

11. A system comprising:
a storage apparatus including a first storage device, a second storage device, and a third storage device; and
a control device including a memory and a processor coupled to the memory and configured to:
store, in the third storage device, first parity data generated based on first data stored in the first storage device and second data stored in the second storage device,
store, in the first storage device, third data as update data of the first data,
execute reading the first data and the third data from the first storage device and reading the first parity data from the third storage device when garbage collection for the first storage device is performed, and execute generating second parity data based on the read first data, the read third data, and the read first parity data.

12. The system according to claim 11, wherein
the processor is further configured to store, in the third storage device, the second parity data.

13. The system according to claim 11, wherein
the first data is stored in a first storage area of the first storage device, and
the third data is stored in a second storage area different from the first storage area of the first storage device.

14. The system according to claim 11, wherein
the storage apparatus includes a plurality of storage devices including the first storage device, the second storage device, and the third storage device, and
the processor is further configured to store the third data in any one storage device different from the first storage device among the plurality of storage devices.

15. The system according to claim 14, wherein
the processor is further configured to delete the third data stored in the anyone storage device after generating the second parity data.

16. The system according to claim 11, wherein
the processor is further configured to, when a failure occurs in the second storage device before the second parity data is generated, restore the second data stored in the second storage device based on the first data stored in the first storage device and the first parity data stored in the third storage device.

17. The system according to claim 11, wherein
the processor is further configured to:
when a failure occurs in the second storage device after the second parity data is generated, restore the second data stored in the second storage device based on the third data stored in the first storage device and the second parity data stored in the third storage device, and
when a failure occurs in the first storage device after the second parity data is generated, restore the third data stored in the first storage device based on the second data stored in the second storage device and the second parity data stored in the third storage device.

18. The system according to claim 11, wherein
the processor is further configured to receive, from the first storage device, a notification indicating that the first storage device is to start the garbage collection, and
the reading the first data and the third data, the reading the first parity data, and the generating the second parity data are executed in response to the notification.

19. A method of controlling a storage apparatus including a first storage device, a second storage device, and a third storage device, the method comprising:
storing, in the third storage device, first parity data generated based on first data stored in the first storage device and second data stored in the second storage device;
storing, in the first storage device, third data as update data of the first data;
reading the first data and the third data from the first storage device and reading the first parity data from the third storage device when garbage collection for the first storage device is performed; and
generating second parity data based on the read first data, the read third data, and the read first parity data.

20. The method according to claim 19 further comprising:
storing, in the third storage device, the second parity data.

* * * * *